United States Patent [19]

Waks

[11] Patent Number: 4,660,467
[45] Date of Patent: Apr. 28, 1987

[54] FOOD PROCESSING APPARATUS

[76] Inventor: Edna Waks, 1501 Ocean Pkwy., Brooklyn, N.Y. 11230

[21] Appl. No.: 827,510

[22] Filed: Feb. 10, 1986

[51] Int. Cl.[4] .................................................. A47J 37/04
[52] U.S. Cl. .......................................... 99/339; 17/32; 99/353; 99/357; 99/391; 99/443 R; 99/450; 426/523
[58] Field of Search ................ 99/339, 353, 389, 391, 99/393, 443 R, 450, 357; 426/523; 17/32

[56] References Cited

U.S. PATENT DOCUMENTS

| | | | |
|---|---|---|---|
| 1,471,727 | 10/1923 | Gomez | 99/353 |
| 1,881,126 | 10/1932 | Parr | 99/353 |
| 2,109,560 | 3/1938 | Willison | 99/353 X |
| 2,208,651 | 7/1940 | Wallace | 99/353 |
| 2,501,712 | 3/1950 | Chodziesner | 99/357 |
| 3,064,555 | 11/1962 | Nanna | 99/353 |
| 3,098,426 | 7/1963 | Lee | 99/339 |
| 4,555,985 | 12/1985 | Pacquet | 99/353 |

Primary Examiner—Billy J. Wilhite
Attorney, Agent, or Firm—Daniel Jay Tick

[57] ABSTRACT

A rotatable platform rotatably mounted in a refrigerated compartment is adapted to support a plurality of chunks of meat thereon. An arm in the refrigerated compartment is in operative proximity with the platform and mounted to sweep chunks of meat off the platform. A meat grinder in the refrigerated compartment below the platform catches and grinds chunks of meat swept off the platform. The meat grinder has an output opening formed through its bottom, whereby meat ground by the meat grinder is provided at the output opening. A drive in the refrigerated compartment coupled to the platform and the meat grinder rotates the platform and operates the meat grinder to grind meat supplied to it. A patty member is placed in the refrigerated compartment beneath the output opening of the meat grinder, whereby ground meat at the output opening is dropped onto the patty member. The patty member has an upper surface and a plurality of depressions formed in the upper surface. A leveling device in operative proximity with the upper surface of the patty member moves ground meat on the upper surface into the depressions and levels the surfaces of the meat in the depressions coplanarly with the upper surface. A grill in a heating compartment grills the meat in the depressions of the patty member. A transport device in the refrigerated compartment transports the patty member through the refrigerated compartment and into the heating compartment. A transport device in the heating compartment transports the patty member through the grill in the heating compartment.

6 Claims, 4 Drawing Figures

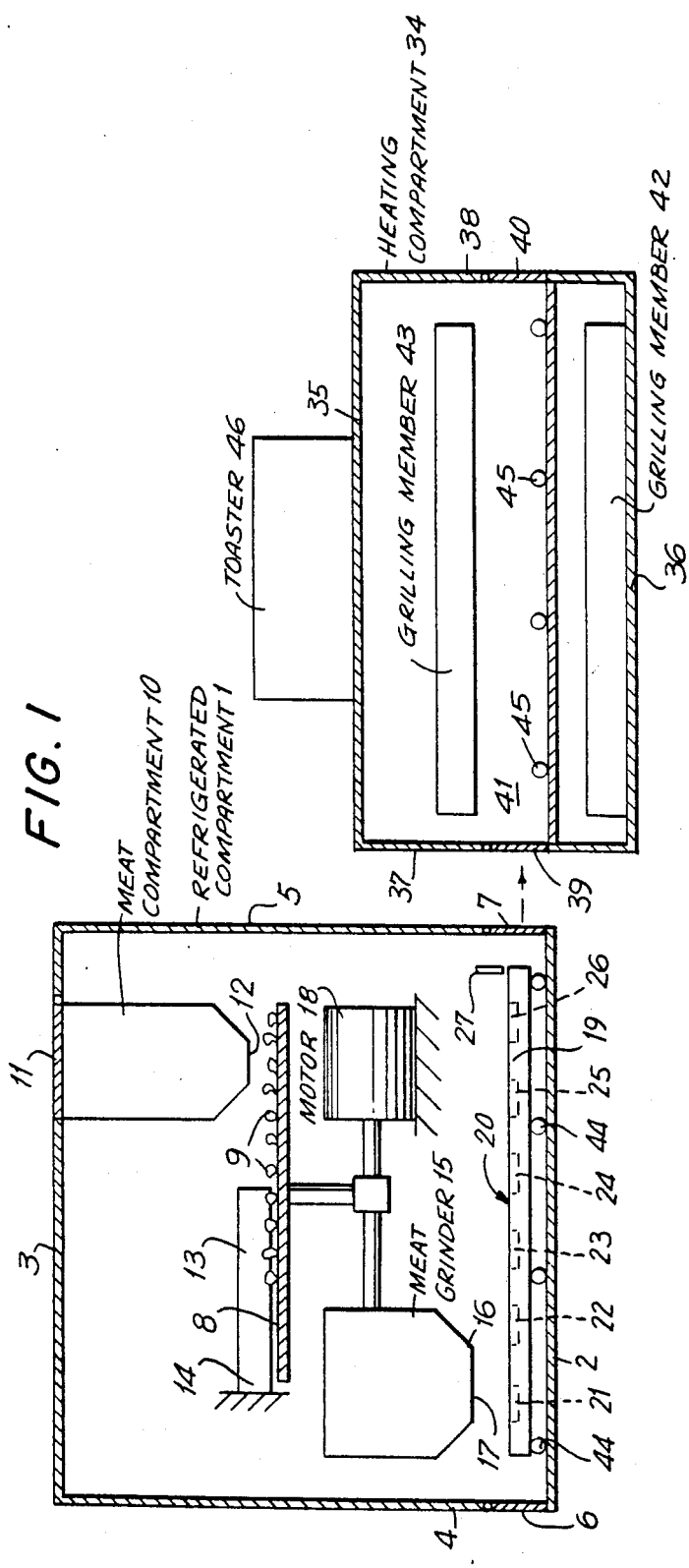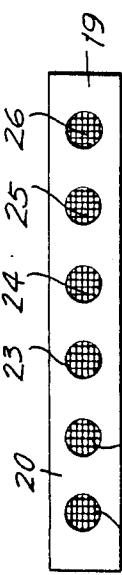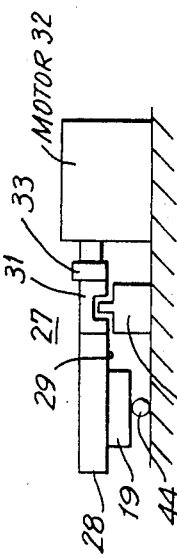

FOOD PROCESSING APPARATUS

BACKGROUND OF THE INVENTION

The present invention relates to food processing apparatus.

In many instances, "fast" or "short-order" foods are prepared in less than appetizing conditions. If such foods were prepared in a wholesome, fresh, clean and appealing atmosphere, the consumers would be considerably more enthusiastic and appreciative thereof and would make their appreciation known by purchasing greatly increased volumes of such foods, thereby considerably enhancing sales.

The principal object of the invention is to provide food processing apparatus for processing foods in a clean, wholesome and fresh atmosphere in full view of consumers thereof.

An object of the invention is to provide food processing apparatus which functions efficiently, effectively and reliably to process foods in clean and wholesome conditions.

Another object of the invention is to provide food processing apparatus of simple structure which functions in an inexpensive semi-automatic manner to process fast or short-order foods.

BRIEF SUMMARY OF THE INVENTION

In accordance with the invention, food processing apparatus for preparing hamburgers from meat comprises a refrigerated compartment ment having a bottom, a top with a top opening formed therethrough and spaced opposite sides with side openings formed therethrough at the bottom. A rotatable platform is rotatably mounted in the refrigerated compartment and is adapted to support a plurality of chunks of meat thereon. An arm is provided in the refrigerated compartment in operative proximity with the platform and is mounted to sweep chunks of meat off the platform as the platform rotates. A meat grinder in the refrigerated compartment below the platform catches and grinds chunks of meat swept off the platform by the arm. The meat grinder has a bottom with an output opening formed therethrough whereby meat ground by the meat grinder is provided at the output opening. A drive in the refrigerated compartment coupled to the platform and the meat grinder rotates the platform and operates the meat grinder to grind meat supplied to it. A patty member is placed in the refrigerated compartment beneath the output opening of the meat grinder whereby ground meat at the output opening is dropped onto the patty member. The patty member has an upper surface and a plurality of depressions formed therein. Leveling means in operative proximity with the upper surface of the patty member moves ground meat on the upper surface into the depressions and levels the surfaces of the meat in the depressions substantially coplanarly with the upper surface. A heating compartment has a top, a bottom and spaced opposite sides with side openings formed therethrough. A grill in the heating compartment grills the meat in the depressions of the patty member. Transport means in the refrigerated compartment transports the patty member through the refrigerated compartment from one of the side openings of the refrigerated compartment to the other and out the other of the side openings of the refrigerated compartment into one of the side openings of the heating compartment. Transport means in the heating compartment transports the patty member through the grill in the heating compartment from the one of the side openings of the heating compartment and out the other of the side openings of the heating compartment whereby grilled meat patties are provided at the other of the side openings of the heating compartment.

A toaster on the heating compartment toasts hamburger buns whereby grilled patties removed from the depressions of the patty member may be placed in buns toasted by the toaster.

The patty member comprises a substantially linearly extending board-like member having a plurality of depressions formed therein in substantially linear arrangement.

The depressions of the patty member have substantially the same dimensions and are substantially equidistantly spaced from each other.

The grill includes a lower grilling member in the area of the bottom of the heating compartment and an upper grilling member in the area of the top of the heating compartment whereby the meat in the depressions of the patty member is simultaneously grilled on both sides.

The leveling means comprises a second arm having a free edge in substantial abutment with the upper surface of the patty member and movable substantially linearly along the upper surface of the patty member whereby the second arm abuts and moves meat along the upper surface. The free edge passes transversely across each of the depressions thereby leveling the surfaces of the meat in the depressions substantially coplanarly with the upper surface.

BRIEF DESCRIPTION OF THE DRAWINGS

In order that the invention may be readily carried into effect, it will now be described with reference to the accompanying drawings, wherein:

FIG. 1 is a schematic view, partly in section, of an embodiment of the food processing apparatus of the invention;

FIG. 2 is a top view of an embodiment of the patty member 19 of FIG. 1;

FIG. 3 is a view of an embodiment of an embodiment of the leveling device of FIG. 1.

DETAILED DESCRIPTION OF PREFERRED EMBODIMENTS

Figure 4:
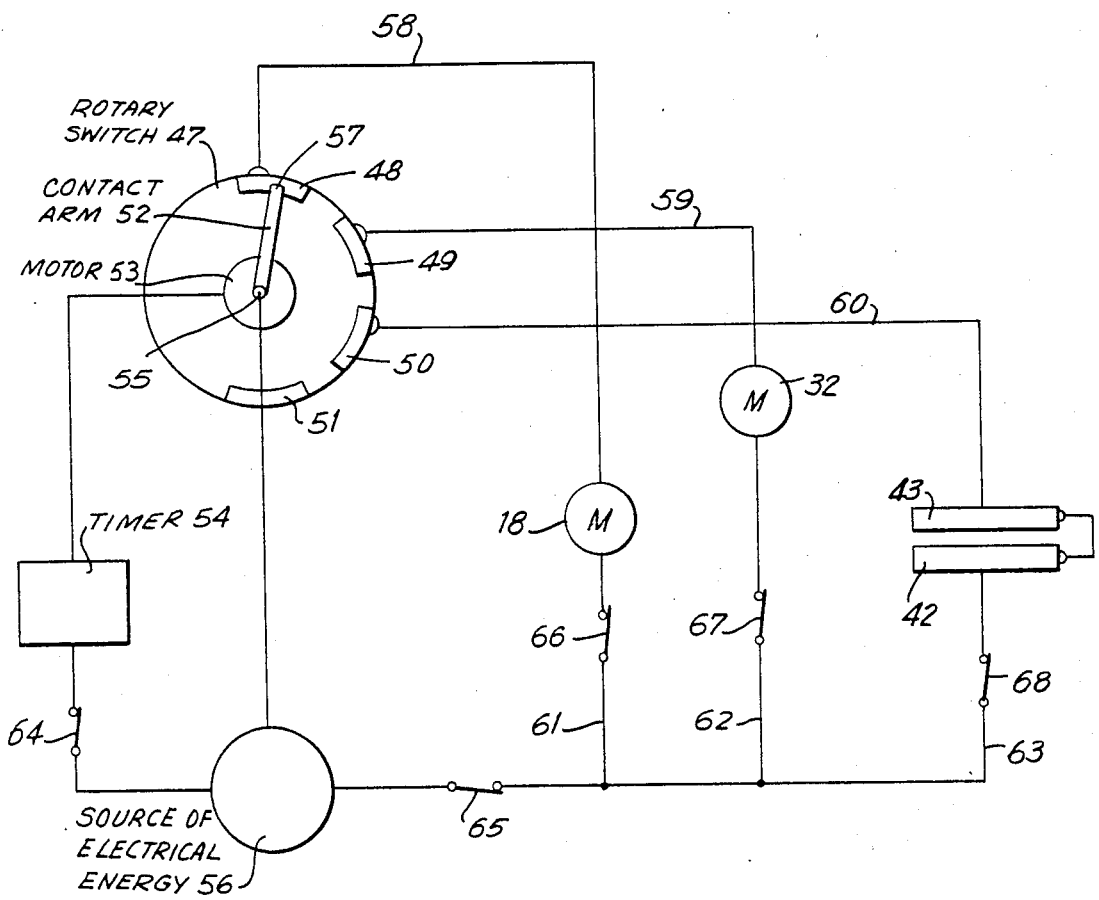
FIG. 4 is a circuit diagram of an embodiment of a control circuit for the apparatus of FIG. 1.

The food processing apparatus of the invention prepares hamburgers from fresh meat, in full view of the consumer. The apparatus of the invention includes a refrigerated compartment 1 (FIG. 1) of any suitable type, having a bottom 2, a top 3 and spaced opposite sides 4 and 5 with side openings formed therethrough and covered by hanging swinging doors 6 and 7, respectively (FIG. 1).

A rotatable platform 8 of any suitable type is rotatably mounted in the refrigerated compartment 1, as shown in FIG. 1. The platform 8 supports a plurality of chunks of fresh meat 9 thereon (FIG. 1). Each chunk of meat 9 is preferably of a predetermined weight such as, for example, one quarter, one half or three quarters of an ounce and may be provided via a meat compartment 10 having an open top at an opening in the top 3 of the refrigerated compartment 1 covered by a door 11 and having a bottom opening 12 over the platform 8.

An arm 13 is provided in the refrigerated compartment 1 in operative proximity with the platform 8 and is mounted, at one end 14 thereof, to sweep chunks of meat 9 off said platform as said platform rotates. The chunks of meat 9 swept off the platform 8 by the arm 13 total a predetermined weight of meat such as, for example, 3½ to 5 ounces.

A meat grinder 15 of any suitable type is mounted in the refrigerated compartment 1 below the platform 8, as shown in FIG. 1, for catching and grinding chunks of meat 9 swept off said platform by the arm 13. The meat grinder 15 has a bottom 16 with an output opening 17 formed therethrough, as shown in FIG. 1, whereby meat ground by said meat grinder is provided at said output opening.

In the embodiment of FIG. 1, the platform 8 is rotated by any suitable known motor 18. The motor 18 is also coupled to the meat grinder 15, as shown in FIG. 1, to operate said meat grinder to grind meat supplied to it.

A patty member 19 (FIGS. 1 and 2) is placed in the refrigerated compartment 1, as shown in FIG. 1, via the side door 6 beneath the output opening 17 of the meat grinder 15, so that ground meat at said output opening is dropped onto said patty member. The patty member 19 (FIGS. 1 and 2) comprises a substantially linearly extending board-like member of non-flammable material having an upper surface 20 (FIGS. 1 and 2) and a plurality of depressions 21, 22, 23, 24, 25 and 26 formed in said member (FIGS. 1 and 2) in substantially linear arrangement. Although six depressions are shown in the patty member 19, any suitable number of depressions, more or less than six, may be provided in said patty member.

The bottom of each depression 21 to 26 is preferably a grating or grid, as shown in FIG. 2, to permit grilling of the bottoms of meat patties in said depressions. The depressions 21 to 26 preferably have the same dimensions and are equidistantly spaced from each other, as shown in FIG. 2. Thus, the depressions 21 to 26 may be shallow circular cylinders having the same radius and axial length and may be spaced the same distance from each other, linearly.

A leveling device 27 (FIG. 1) is provided in operative proximity with the upper surface 20 of the patty member 19 for moving ground meat on said upper surface into the depressions 21 to 26 and leveling the surfaces of the meat in said depressions substantially coplanarly with said upper surface. The leveling device 27, as shown with greater clarity in FIG. 3, comprises an arm 28 having a free edge 29 in substantial abutment with the upper surface 20 of the patty member 19. The arm 28 is movable substantially linearly along the upper surface 20 of the patty member 19, by any suitable known means, in a manner whereby said arm abuts and moves meat along said upper surface with the free edge 29 of said arm passing transversely across each of the depressions 21 to 26 thereby leveling the surfaces of the meat in said depressions substantially coplanarly with said upper surface.

The leveling device 27 may thus comprise, as shown in FIG. 3, a track 30, a guide member 31 extending from one end of the arm 28 and seated on said track for guiding said arm substantially linearly along the upper surface 20 of the patty member 19, a motor 32 of any suitable known type and a coupling 33 of any suitable known type coupling said motor to said guide member for moving said arm linearly back and forth. The coupling 33 may comprise a belt and wheel, or sprocket and chain arrangement, for example. The free edge 29 passes transversely across each of the depressions 21 to 26, thereby leveling the surfaces of the meat in said depressions substantially coplanarly with the upper surface 20.

A heating compartment 34 (FIG. 1) has a top 35, a bottom 36 and spaced opposite sides 37 and 38 with side openings formed therethrough and covered by hanging swinging doors 39 and 40, respectively (FIG. 1).

A grill 41 (FIG. 1) of any suitable known type is provided in the heating compartment 34 for grilling the meat in the depressions 21 to 26 of the patty member 19. The grill 41 includes a lower grilling member 42 in the area of the bottom 36 of the heating compartment 34 and an upper grilling member 43 in the area of the top 35 of said heating compartment. The meat in the depressions 21 to 26 of the patty member 19 is thus simultaneously grilled on both sides, since said patty member passes between the lower and upper grilling members 42 and 43, respectively.

A transport device, consisting of a plurality of ball bearings 44 in the refrigerated compartment 1 (FIG. 1) transports the patty member 19 through said refrigerated compartment from the door 6 and its corresponding side opening to the door 7 and its corresponding side opening and out the last-mentioned side opening of said refrigerated compartment into the door 39 and its corresponding side opening of the heating compartment 34.

A transport device, consisting of a plurality of ball bearings 45 in the heating compartment 34 (FIG. 1) transports the patty member 19 through the grill 41 in said heating compartment from the door 39 and its corresponding side opening and out the door 40 and its corresponding side opening of said heating compartment. Grilled meat patties are thus provided at the door 40 and its corresponding opening of the heating compartment 34.

A toaster or toaster over 46 (FIG. 1) of any suitable known type is provided on the heating compartment 34 for toasting hamburger buns. The meat patties in the depressions 21 to 26 of the patty member 19 are grilled on both sides, simultaneously. The grilled patties are then removed from the patty member 19 and placed in toasted buns by an attendant or attendants.

Thus, in full view of the consumers, and by an essentially automatic operation, fresh meat is ground, formed into patties, grilled and placed in toasted buns. The operation is controlled by a simple switch circuit, shown in FIG. 4, for controlling the motors 18 and 32 and the grill 41.

The control circuit of FIG. 4 is essentially a timer circuit for controlling the rotation of the platform 8, the motors 18 and 34 and the grill 41 in a predetermined sequence, as hereinafter described. In FIG. 4, any suitable timer switch such as, for example, a rotary switch 47 has a plurality of electrical contacts 48, 49, 50 and 51 spaced from each other, and a contact arm 52 driven by a motor 53 of any suitable known type via a timer 54 of any suitable known type. The contact arm 52 is rotated by the motor 53 in a manner whereby it electrically contacts the contacts 48 to 51 sequentially, remaining in contact with each of said contacts for a predetermined period of time. One end 55 of the contact arm 52 is electrically connected to a source of electrical energy 56 of any suitable type and the spaced opposite end 57 of said contact arm sequentially makes electrical contact with the contacts 48 to 51. The contact 51 is unused in the illustrated embodiment.

The electrical contact 48 is electrically connected to one terminal of the motor 18 via an electrical conductor 58. The electrical contact 49 is electrically connected to one terminal of the motor 32 via electrical conductor 59. The electrical contact 50 is electrically connected to one terminal of the lower and upper grilling members 42 and 43, respectively, via an electrical conductor 60.

The source of electrical energy 56 is electrically connected to the other terminal of the motor 18 via an electrical conductor 61, to the other terminal of the motor 32 via an electrical conductor 62 and to the other terminal of the grilling members 42 and 43 via an electrical conductor 63. Various switches 64, 65, 66, 67 and 68 are connected in the circuit to permit selective energization and deenergization thereof.

In operation, the contact arm 52 of the rotary switch 47 first contacts the contact 48, thereby energizing the motor 18, which then rotates the platform 8, so that chunks of meat 9 are swept off the platform 8 into the meat grinder 15, which grinds the meat. The contact arm 52 then moves to contact with the contact 49, thereby energizing the motor 32, which operates the leveling device 27, to fill the depressions 21 to 26 of the patty member 19 with ground meat and level off the meat in said depressions. The contact arm 52 then moves into contact with the contact 50, thereby energizing the grill 41, so that the meat patties are grilled.

Among the many appetizing food items which may be prepared manually in full view of the consumers in an artful, wholesome, clean and appetizing manner are a grilled cheese sandwich, a tuna fish sandwich, chicken pot pie, an ice cream dessert, a soda dessert and a funnel cake dessert.

The grilled cheese sandwich may be prepared by removing a cheese sandwich stored in a refrigerator and grilling same to order. This may be accomplished by placing the sandwich in a depression formed in a Teflon grill. A weight having a heating element embedded therein may then be placed over the cheese sandwich in the depression, thereby toasting both sides of the sandwich simultaneously.

A tuna fish sandwich may be prepared by refrigerating tuna fish or tuna fish salad in a portion controlled container. The contents of a container may then be placed on a selected one of rye, pumpernickel and white bread.

Chicken pot pie may be prepared in a crockery form dish and served with a biscuit and cranberry sauce or a selected slaw.

The ice cream dessert may be prepared as an old-fashioned 16 ounce ice cream soda having a desired one of vanilla, chocolate, strawberry or coffee ice cream. Home-made whipped cream could be added.

The soda dessert may be prepared as a plain 16 ounce soda or such a soda with a desired flavor such as, for example, birch beer, root beer or Coca Cola added.

The funnel cake may be topped with powdered sugar, fruit topping or ice cream.

While the invention has been described by means of a specific example and in a specific embodiment, I do not wish to be limited thereto, for obvious modifications will occur to those skilled in the art without departing from the spirit and scope of the invention.

I claim:

1. Food processing apparatus for preparing hamburgers from meat, said apparatus comprising
    a refrigerated compartment having a bottom, a top with a top opening formed therethrough and spaced opposite sides with side openings formed therethrough at said bottom;
    a rotatable platform rotatably mounted in said refrigerated compartment, said platform being adapted to support a plurality of chunks of meat thereon;
    an arm in said refrigerated compartment in operative proximity with said platform and mounted to sweep chunks of meat off said platform, as said platform rotates;
    a meat grinder in said refrigerated compartment below said platform for catching and grinding chunks of meat swept off said platform by said arm, said meat grinder having a bottom with an output opening formed therethrough whereby meat ground by said meat grinder is provided at said output opening;
    drive means in said refrigerated compartment coupled to said platform and said meat grinder for rotating said platform and operating said meat grinder to grind meat supplied to it;
    a patty member placed in said refrigerated compartment beneath said output opening of said meat grinder whereby ground meat at said output opening is dropped onto said patty member, said patty member having an upper surface and a plurality of depressions formed therein;
    leveling means in operative proximity with said upper surface of said patty member for moving ground meat on said upper surface into said depressions and leveling the surfaces of the meat in said depressions substantially coplanarly with said upper surface;
    a heating compartment having a top, a bottom and spaced opposite sides with side openings formed therethrough;
    grilling means in said heating compartment for grilling said meat in said depressions of said patty member;
    transport means in said refrigerated compartment for transporting said patty member through said refrigerated compartment from one of the side openings of said refrigerated compartment to the other and out said other of said side openings of said refrigerated compartment into one of the side openings of said heating compartment; and
    transport means in said heating compartment for transporting said patty member through said grilling means in said heating compartment from said one of the side openings of said heating compartment and out the other of said side openings of said heating compartment whereby grilled meat patties are provided at said other of said side openings of said heating compartment.

2. Food processing apparatus as claimed in claim 1, further comprising toasting means on said heating compartment for toasting hamburger buns whereby grilled patties removed from said depressions of said patty member may be placed in buns toasted by said toasting means.

3. Food processing apparatus as claimed in claim 1, wherein said patty member comprises a substantially linearly extending board-like member having a plurality of depressions formed therein in substantially linear arrangement.

4. Food processing apparatus as claimed in claim 3, wherein said depressions of said patty member have substantially the same dimensions and are substantially equidistantly spaced from each other.

5. Food processing apparatus as claimed in claim 3, wherein said grilling means includes a lower grilling member in the area of the bottom of said heating compartment and an upper grilling member in the area of the top of said heating compartment whereby said meat in said depressions of said patty member is simultaneously grilled on both sides.

6. Food processing apparatus as claimed in claim 3, wherein said leveling means comprises a second arm having a free edge in substantial abutment with said upper surface of said patty member and movable substantially linearly along said upper surface of said patty member in a manner whereby said second arm abuts and moves meat along said upper surface, said free edge passing transversely across each of said depressions thereby leveling the surfaces of the meat in said depressions substantially coplanarly with said upper surface.

* * * * *